United States Patent
Line et al.

(10) Patent No.: US 10,081,282 B2
(45) Date of Patent: Sep. 25, 2018

(54) INNER CARRIER MODULE FOR SEATBACK ASSEMBLY

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Christian J. Hosbach, Taylor, MI (US); Nicholas Alphonse Billardello, Macomb, MI (US); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 15/345,730

(22) Filed: Nov. 8, 2016

(65) Prior Publication Data
US 2018/0126886 A1    May 10, 2018

(51) Int. Cl.
| | | |
|---|---|---|
| A47C 1/10 | (2006.01) |
| A47C 7/36 | (2006.01) |
| A61G 15/00 | (2006.01) |
| B60R 22/28 | (2006.01) |
| B60N 2/68 | (2006.01) |
| B60N 2/80 | (2018.01) |

(52) U.S. Cl.
CPC ............. *B60N 2/686* (2013.01); *B60N 2/682* (2013.01); *B60N 2/80* (2018.02)

(58) Field of Classification Search
CPC . B60N 2/686; B60N 2/80; B60N 2/48; B60N 2/682; B60N 2/68; B60N 2/882; B60N 2/894; B60N 2/897; B60N 2/5858; B60N 2/5891

USPC .... 297/391, 452.13, 452.14, 452.18, 452.58, 297/452.59, 452.65

See application file for complete search history.

(56) References Cited

U.S. PATENT DOCUMENTS

| | | | |
|---|---|---|---|
| 7,401,852 B2 | 7/2008 | Humer et al. | |
| 7,850,247 B2 | 12/2010 | Stauske et al. | |
| 8,474,913 B2 | 7/2013 | Line | |
| 8,727,374 B1* | 5/2014 | Line | B60R 21/207 280/728.3 |
| 9,649,963 B2* | 5/2017 | Line | B60N 2/64 |
| 9,845,032 B1* | 12/2017 | Line | B60N 2/5858 |

(Continued)

*Primary Examiner* — Mark R Wendell
(74) *Attorney, Agent, or Firm* — Vichit Chea; Price Heneveld LLP

(57) ABSTRACT

A seatback assembly includes an inner carrier module having an upper cross member. The upper cross member includes first and second mounting slots and first and second access apertures disposed therethrough. A seatback frame assembly includes an upper frame member with access apertures disposed therethrough. The inner carrier module is located to a front side of the seatback frame assembly when a locator member of the inner carrier module is received in a locating aperture of the seatback frame assembly. The access apertures of the inner carrier module are aligned with the access apertures of the seatback frame assembly when the two components are coupled together. Guide sleeves are received though the access apertures. A back panel module mounts to a rear side of the seatback frame assembly, wherein upper hook members of the back panel are partially received in the mounting slots of the inner carrier module.

20 Claims, 12 Drawing Sheets

(56) References Cited

U.S. PATENT DOCUMENTS

| | | | |
|---|---|---|---|
| 2005/0248189 A1* | 11/2005 | Prasatek | B60N 2/64 297/188.04 |
| 2014/0203599 A1* | 7/2014 | Line | B60N 2/5642 297/180.14 |
| 2015/0001899 A1* | 1/2015 | Line | B60R 7/043 297/188.04 |
| 2015/0251579 A1* | 9/2015 | Line | B60N 2/64 297/452.18 |
| 2015/0321614 A1* | 11/2015 | Line | B60R 7/005 297/188.04 |
| 2016/0096450 A1* | 4/2016 | Kondrad | B60N 2/7094 297/285 |
| 2016/0288681 A1* | 10/2016 | Ferretti | B60N 2/72 |

\* cited by examiner

_US 10,081,282 B2_

INNER CARRIER MODULE FOR SEATBACK ASSEMBLY

FIELD OF THE INVENTION

The present invention generally relates to a vehicle seating assembly, and more particularly, to a vehicle seating assembly having an inner carrier module that couples to a seat frame assembly and a back panel using molded in attachment features.

BACKGROUND OF THE INVENTION

Traditional automotive seats are assembled by bringing together hundreds of parts to be incorporated into a seat structure. This assembly can be a technical assembly, wherein assembly time is an important consideration. Thus, the ability to modularize the seatback assembly process is desired. The present invention provides for a modularized assembly process that allows for the seat structure assembly to be sourced to a location independent of the traditional assembly plant. For use with the present invention, a new intermediate module design is needed to achieve all of the structural attachment needs of the seatback, as well as providing a clean aesthetic for the vehicle seatback.

SUMMARY OF THE INVENTION

One aspect of the present invention includes a seatback assembly having an inner carrier module with first and second side members and an upper cross member. The upper cross member includes first and second mounting slots and first and second access apertures disposed therethrough. A seatback frame assembly includes first and second side frame members and an upper frame member with access apertures disposed therethrough. The inner carrier module is mounted to a front side of the seatback frame assembly, such that first and second access apertures of the inner carrier module are aligned with the first and second access apertures of the seatback frame assembly when the two components are coupled together. A back panel module includes first and second side members and an upper cross member. The upper cross member includes first and second upper hook members disposed thereon. In assembly, the back panel module mounts to a rear side of the seatback frame assembly, wherein the first and second upper hook members are partially received in the first and second mounting slots of the inner carrier module.

Another aspect of the present invention includes a seatback assembly having an inner carrier module with first and second access apertures and an outwardly extending locator member. A seatback frame assembly includes first and second access apertures and a locating aperture. The locator member of the inner carrier module is received in the locating aperture of the seatback frame assembly to align the access apertures of the inner carrier module with the access apertures of the seatback frame assembly.

Yet, another aspect of the present invention includes a seatback assembly having an inner carrier module with an upper cross member. The upper cross member includes a substantially vertical front portion and a substantially horizontal rear portion, wherein first and second access apertures are disposed through the substantially horizontal rear portion, and further wherein a locator member outwardly extends from a rear side of the substantially vertical front portion. A seatback frame assembly includes an upper frame member with first and second access apertures and a locating aperture disposed thereon. The locator member of the inner carrier module is received in the locating aperture of the seatback frame assembly to align the first and second access apertures of the inner carrier module with the first and second access apertures of the seatback frame assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
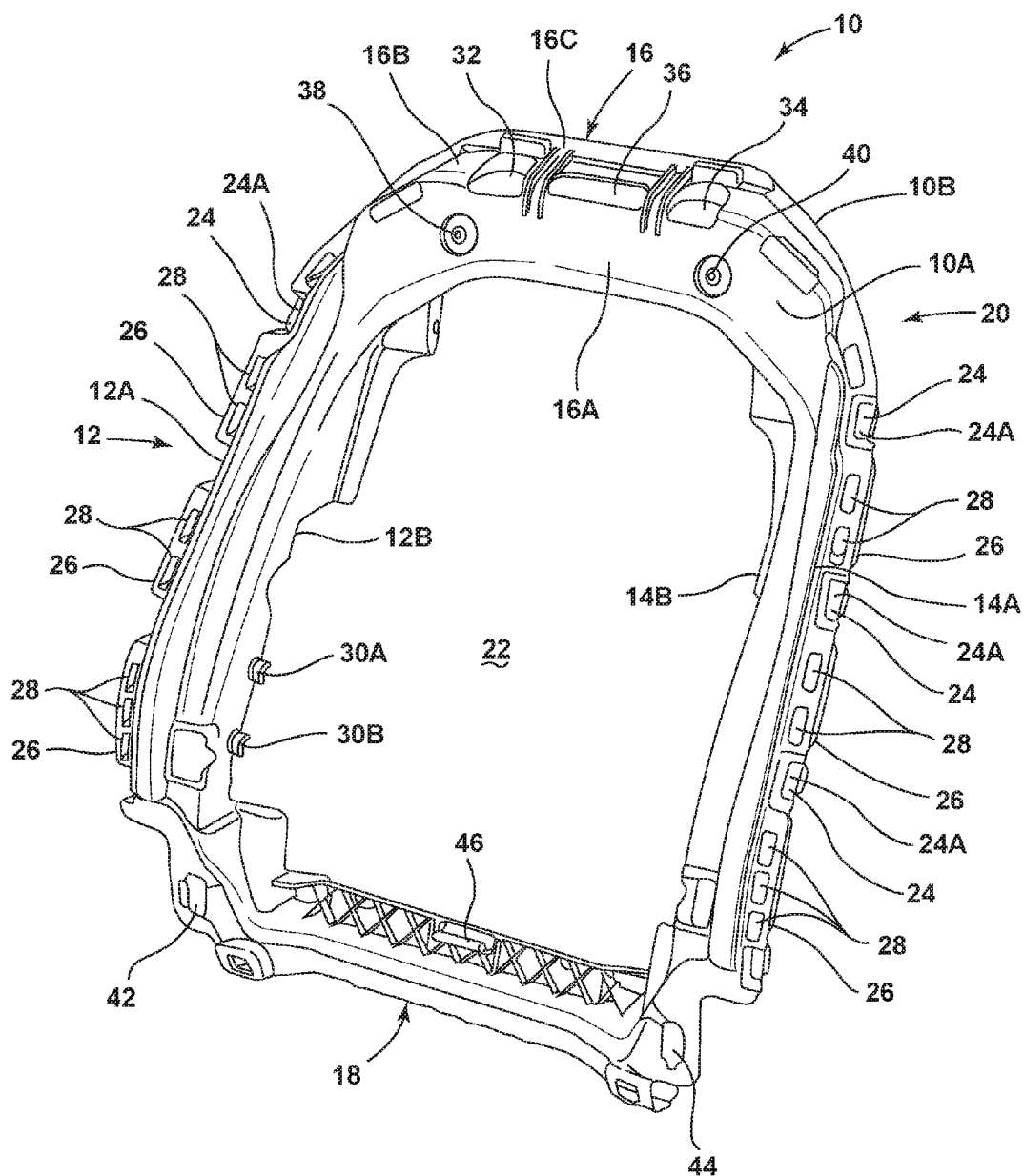
FIG. 1 is a front perspective view of an inner carrier module according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

Referring now to FIG. 1, the reference numeral 10 generally designates an inner carrier module for use in a vehicle seatback assembly. The inner carrier module 10 includes a front side 10A and a rear side 10B. The inner carrier module 10 further includes first and second side members 12, 14 which are generally spaced-apart and interconnected by upper and lower cross-members 16, 18. Thus, as shown in FIG. 1, the side members 12, 14 and upper and lower cross-members 16, 18 generally define a frame structure 20 disposed around a central aperture or window 22. The inner carrier module 10 is contemplated to be a composite part which is comprised of a polymeric or injection molded material, such that the inner carrier module 10 is a unitary part as shown in FIG. 1. The first and second side members 12, 14 generally include outermost edges 12A, 14A, respectively, and innermost edges 12B, 14B, respectively. The outermost edges 12A, 14A generally define side perimeters of the inner carrier module 10, and also form a portion of a releasable mating joint feature with a back panel module, as further described below. The first and second side members 12, 14 further include a plurality of clip embossments 24, which are generally disposed adjacent to the outer edges 12A, 14A along a periphery of the inner carrier module 10. As further shown in FIG. 1, the clip embossments 24 of the first and second side members 12, 14 include planar mounting surfaces 24A which are used to couple the inner carrier module 10 to a back panel module, as further described below. The clip embossments 24 are spaced-apart along the first and second side members 12, 14 with trim cover attachment features 26 disposed therebetween. Thus, the trim cover attachment features 26 are disposed along the first and second side members 12, 14 and include mounting slots 28 disposed therethrough. In assembly, the mounting slots 28 are used to couple a support cushion assembly to the inner carrier module 10. As further shown in FIG. 1, inner mounting structures 30A, 30B are disposed on the innermost edges 12B, 14B of the first and second side members 12, 14 and are used to couple the inner carrier module 10 to reinforcement brackets, as further described below.

With specific reference to the upper cross member 16, the upper cross member 16 includes a stepped configuration having a substantially vertical front portion 16A, a substantially horizontal rear portion 16B, and a substantially vertical upper rim portion 16C. First and second access apertures 32, 34 are disposed through the rear portion 16B and are configured to receive guide sleeves for a headrest assembly to mechanically attach the inner carrier module 10 to a seat frame assembly, as further described below. A central receiving slot 36 is also disposed through the rear portion 16B of the upper cross member 16 and is positioned between the first and second access apertures 32, 34. First and second mounting bosses 38, 40 are disposed on the substantially vertical front portion 16A of the upper cross member 16 and are used to couple the inner carrier module 10 to a seat frame assembly. The terms "substantially vertical" and "substantially horizontal" as used in this disclosure generally indicate portions of a part that are perpendicular to each other. Thus, while the inner carrier module 10 can be reclined as used in a seatback assembly, the specific portions above are identified in the figures as shown with the inner carrier module 10 in an upright position. Similar terms are also used to describe parts of a seatback frame assembly, as further discussed below.

With specific reference to the lower cross member 18, first and second mounting slots 42, 44 are disposed through opposite sides of the lower cross member 18 and are used to couple the inner carrier module 10 to a support cushion assembly, as further described below. A central clip member 46 is disposed on the lower cross member 18 and is also used to couple the inner carrier module 10 to a support cushion assembly.

Figure 2A:
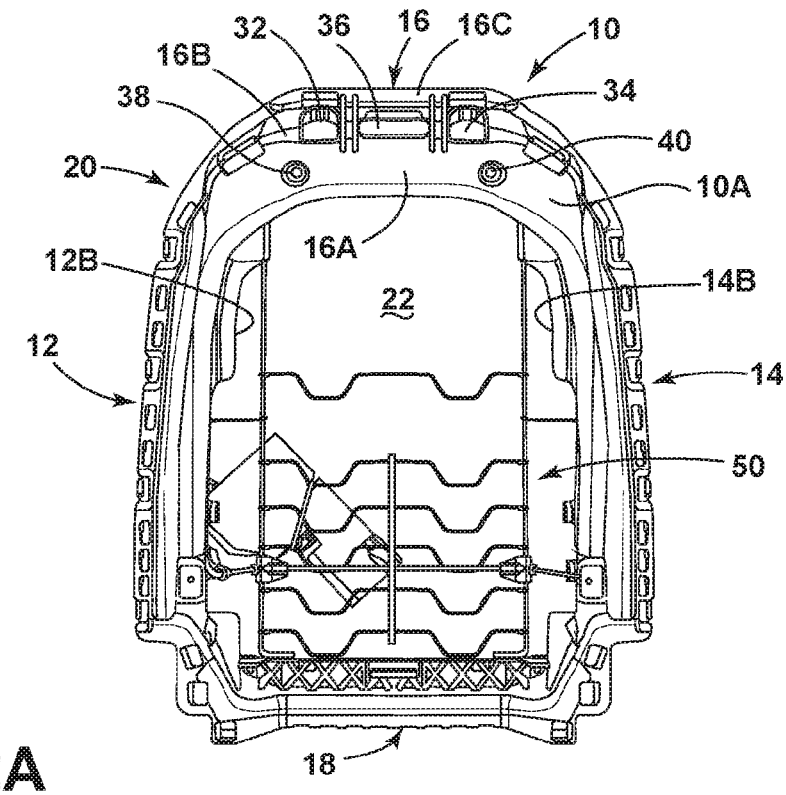
FIG. 2A is a front elevational view of the inner carrier modules of FIG. 1.

Referring now to FIG. 2A, the inner carrier module 10 is shown from the front side 10A and having a suspension assembly 50 that is coupled to the frame 20 and generally disposed within the window 22. Specifically, the suspension assembly 50 is coupled to the first and second side members 12, 14 and the upper and lower cross members 16, 18 at inner portions thereof. The suspension system 50 is configured to support a lumbar portion of a vehicle occupant in a flexibly resilient manner.

Figure 2B:
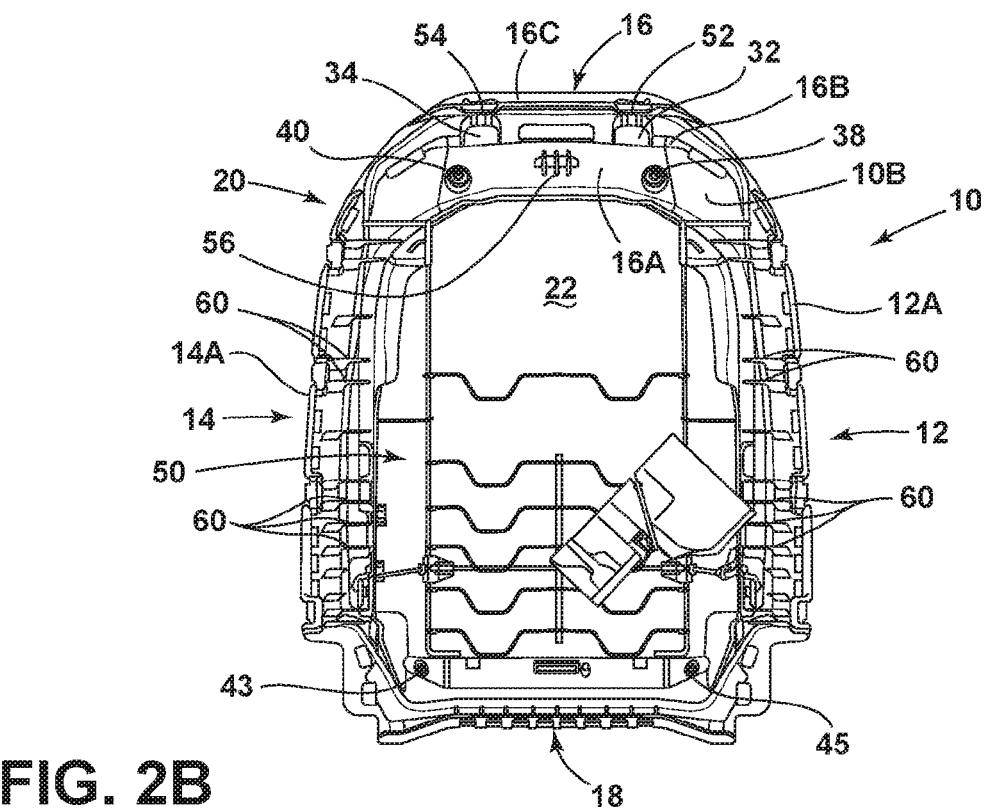
FIG. 2B is a rear elevational view of the inner carrier modules of FIG. 1.

Referring now to FIG. 2B, the rear side 10B of the inner carrier module 10 is shown, wherein the upper cross member 16 includes first and second mounting channels 52, 54 disposed on the upper rim portion 16C of the upper cross member 16. Specifically, the first and second mounting channels 52, 54 are disposed above the first and second access apertures 32, 34 which are disposed on the substantially horizontal rear portion 16B of the upper cross member 16. On the substantially vertical front portion 16A of the upper cross member 16, a four-way locator member 56 outwardly extends from the substantially vertical front portion 16A of the upper cross member 16 and is generally centrally disposed between the first and second mounting bosses 38, 40. In assembly, the first and second mounting channels 52, 54 and the four-way locator member 56 are used to couple the inner carrier module 10 to a seat frame assembly, as well as a back panel module, as further described below. In FIG. 2B, the lower cross member 18 is shown having mounting bosses 43, 45 disposed on opposite sides of the lower cross member 18. The mounting bosses 43, 45 are used to couple the inner carrier module 10 to a seatback frame assembly, as further described below.

As further shown in FIG. 2B, the side members 12, 14 of the inner carrier module 10 include reinforcement ribs 60 which are disposed in a substantially horizontal manner between the outermost edges 12A, 14A and the innermost edges 12B, 14B of the respective side members 13, 14. The reinforcement ribs 60 rigidify the inner carrier module 10 at the side members 12, 14 thereof and provide increased durability to the overall structure of the inner carrier module 10.

Figure 3A:
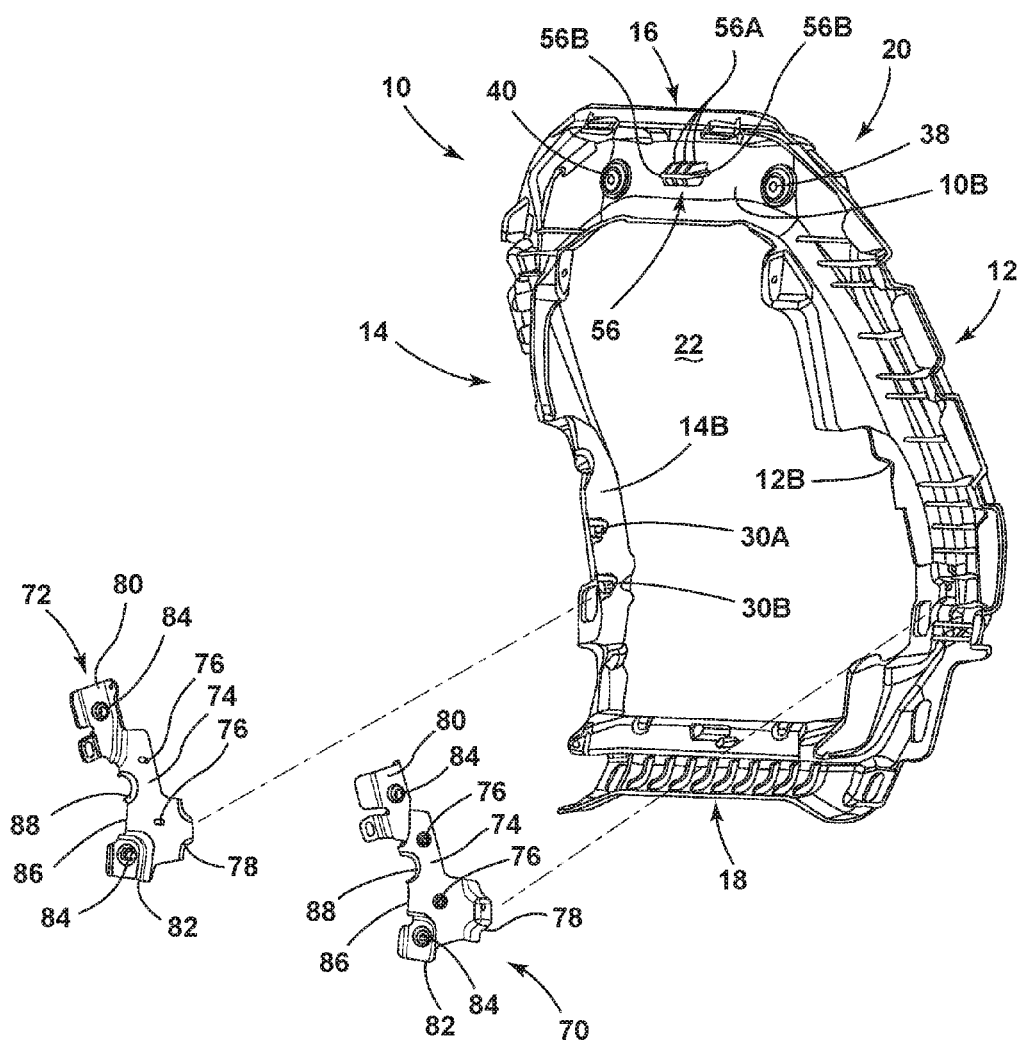
FIG. 3A is a front perspective view of the inner carrier module of FIG. 1 showing first and second reinforcement brackets exploded away therefrom.

Referring now to FIG. 3A, the inner carrier module 10 is shown having reinforcement brackets 70, 72 exploded away therefrom. The reinforcement brackets 70, 72 are contemplated to be stamped metal parts which couple to the side members 12, 14 at the upper and lower inner mounting structures 30A, 30B disposed on the innermost edges 12B, 14B thereof. The reinforcement brackets 70, 72 include body portions 74 through which fasteners 76 pass through and couple to the upper and lower inner mounting structures 30A, 30B of the side members 12, 14 of the inner carrier module 10. The body portion 74 further includes a forwardly extending portion 78 and upper and lower rearwardly extending anchoring plates 80, 82. The upper and lower anchoring plates 80, 82 extend rearwardly from the body portion 74 and are configured to couple to a seatback frame assembly using fasteners 84. On a rear edge 86 of the body portion 74, an inwardly curved portion 88 is disposed which is configured to align with apertures disposed through the seatback frame assembly for supporting a cross member therebetween, as further described below. As further shown in FIG. 3A, the locator member 56 extends outwardly from the rear side 10B of the inner carrier module 10 at upper cross member 16 and includes a number of vertically disposed ribs 56A and a horizontally disposed rib 56B. It is contemplated that the locator member 56 may include any number of vertical or horizontal ribs in order to effectively locate the inner carrier module 10 to a seatback frame assembly, as further described below.

Figure 3B:
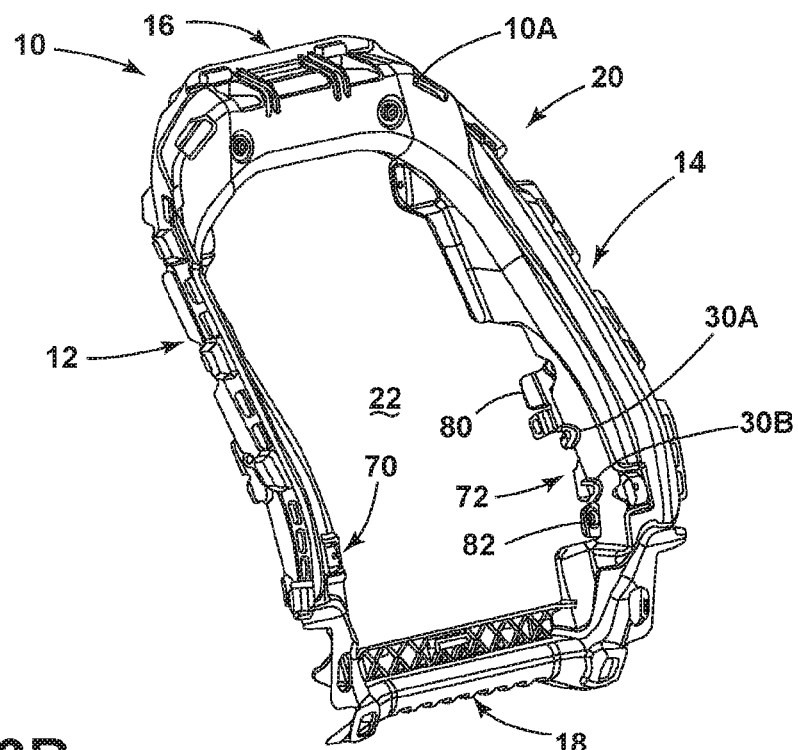
FIG. 3B is a front perspective view of the inner carrier module of FIG. 3A with the first and second reinforcement brackets coupled to the inner carrier module.
Figure 3C:
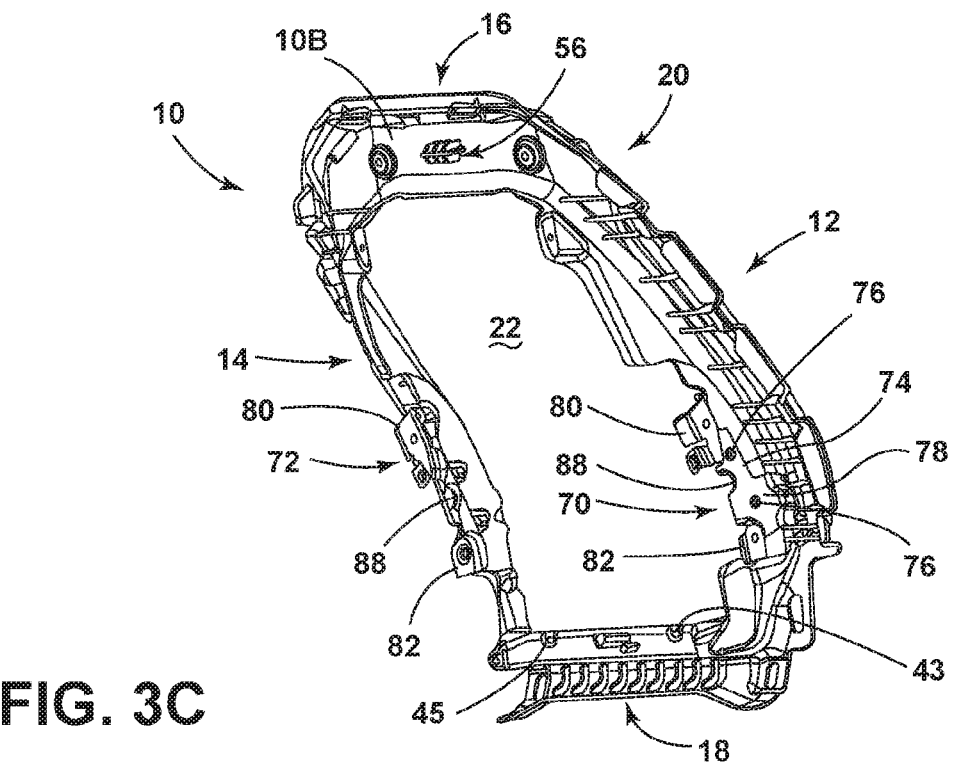
FIG. 3C is a rear perspective view of the inner carrier module of FIG. 3B.

Referring now to FIGS. 3B and 3C, the reinforcement brackets 70, 72 are shown coupled to the side members 12, 14 of the inner carrier module 10. In use, the reinforcement brackets provide mounting features to mount the inner carrier module 10 to a seatback frame assembly to reinforce a connection therebetween and to prevent squeak and rattle of the seatback components in use.

Figure 3D:
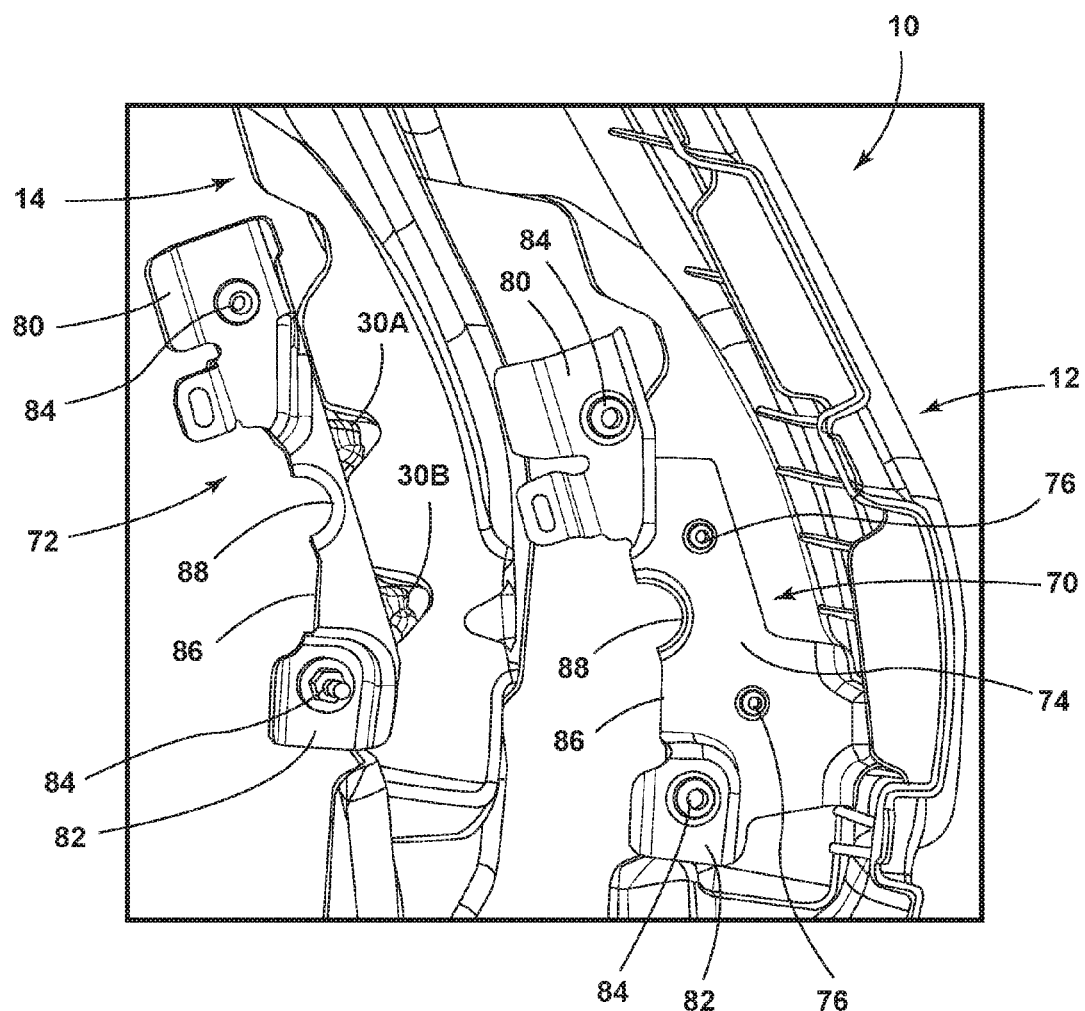
FIG. 3D is a close-up view of the first and second reinforcement brackets coupled to the inner carrier module of FIG. 3C.

Referring now to FIG. 3D, the first and second reinforcement brackets 70, 72 are shown coupled to the side members 12, 14 of the inner carrier module 10. The upper and lower anchoring plates 80, 82 are shown rearwardly extending from the side members 12, 14 while the body portion 74 of the reinforcement brackets 70, 72 are shown coupled to the side members 12, 14 via fasteners 76. The fasteners 76 are received through inner mounting structures 30A, 30B disposed on the side members 12, 14 in assembly.

Figure 4A:
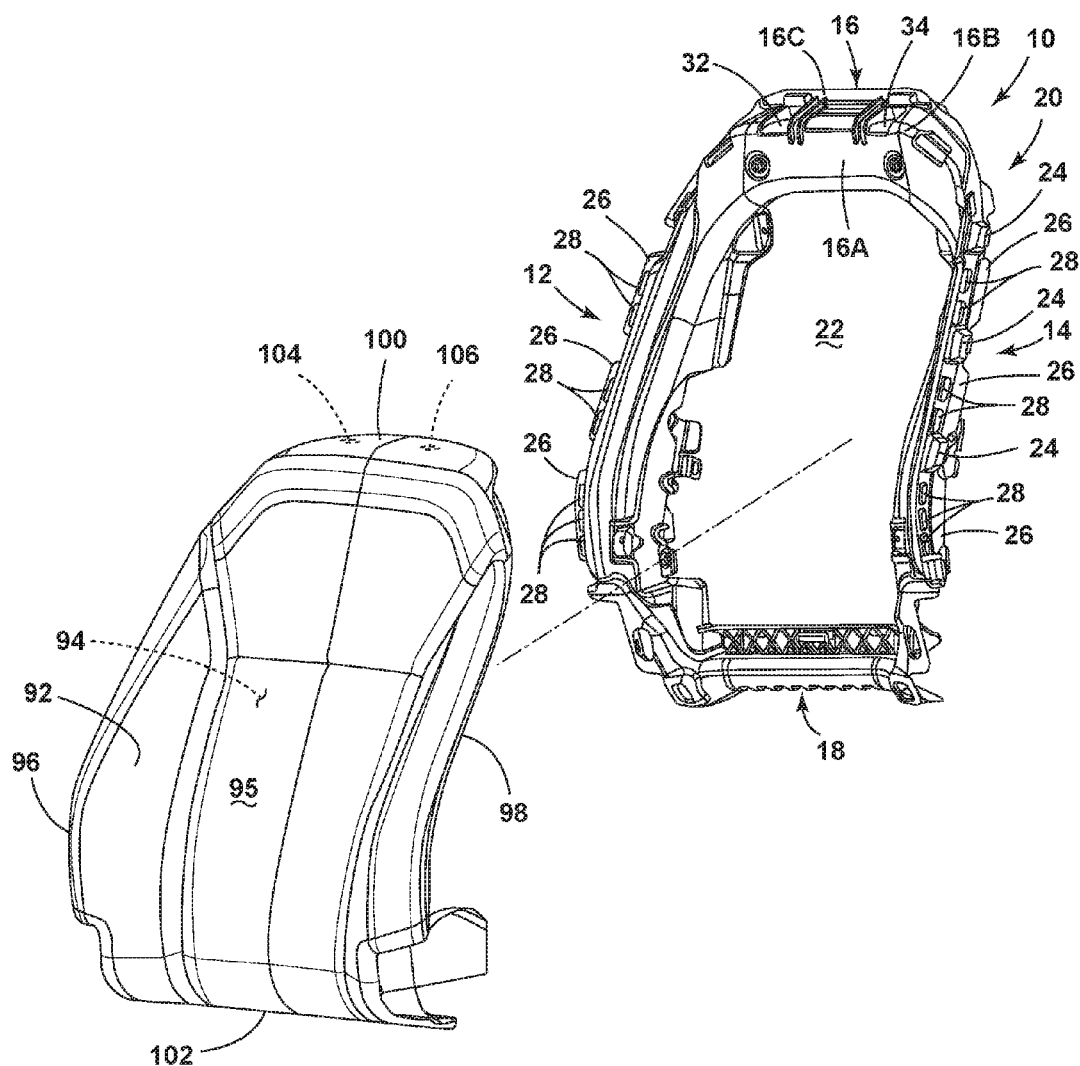
FIG. 4A is a front perspective view of the inner carrier module of FIG. 3B showing a support cushion assembly exploded away therefrom.
Figure 4B:
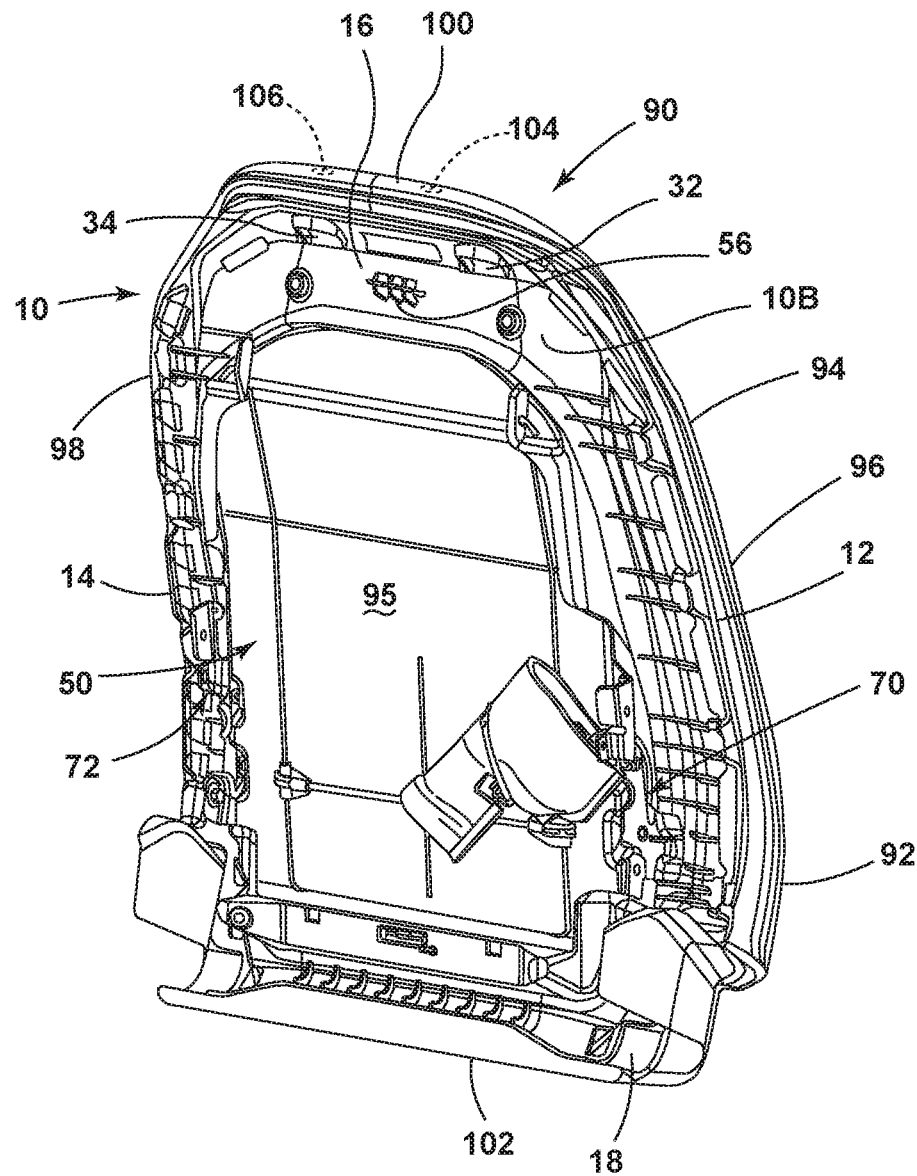
FIG. 4B is a rear perspective view of the inner carrier module of FIG. 4A showing the support cushion coupled thereto to from an assembled front seatback module.

Referring now to FIG. 4A, an upholstered trim cover 92 is shown disposed over a support cushion assembly 94. The support cushion assembly 94 is a contoured component, and the trim cover 92 includes a reciprocal configuration thereto, such that the trim cover 92 closely covers the contours of the support cushion assembly 94. The trim cover 92 is contemplated to be comprised of a fabric, vinyl or leather material, or other like covering material (or combination thereof), while the support cushion assembly 94 is contemplated to be comprised of a resilient foam material which may include areas of varying density or rigidity. The support cushion assembly 94 is configured to support a back area of a vehicle occupant in use. In assembly, the trim cover 92 and support cushion 94 are further coupled to and supported by the inner carrier module 10. In FIG. 4A, the support cushion assembly 94 includes a central portion 95 surrounded by first and second sides 96, 98 and upper and lower sides 100, 102. The first and second sides 96, 98 are configured to align with and couple to the first and second side members 12, 14 of the inner carrier module 10 at attachment features 26 using clips that couple to mounting slots 28 of attachment features 26. The upper and lower sides 100, 102 are configured to align with and couple to the upper and lower cross members 16, 18 of the inner carrier module 10 in assembly. The upper side 100 of the front seatback module 90 is contemplated to include access apertures 104, 106 disposed through the trim cover 92 to provide access to the access apertures 32, 34 disposed through the horizontal middle portion 16B of the upper cross member 16 of the inner carrier module 10. In this way, guide sleeves (FIG. 5A) can be inserted into the access apertures 32, 34 through the upper side 100 of the front seatback module 90 to couple the inner carrier module 10 and the front seatback module 90 to a seatback frame assembly, as further described below. With reference to FIG. 4B, the inner carrier module 10 is shown coupled to the support cushion assembly 94 to define an assembled front seatback module 90. Access apertures 104, 106 disposed through the trim cover 92 are shown aligned with the access apertures 32, 34 of the upper cross member 16 of the inner carrier module 10 as assembled.

Figure 5A:
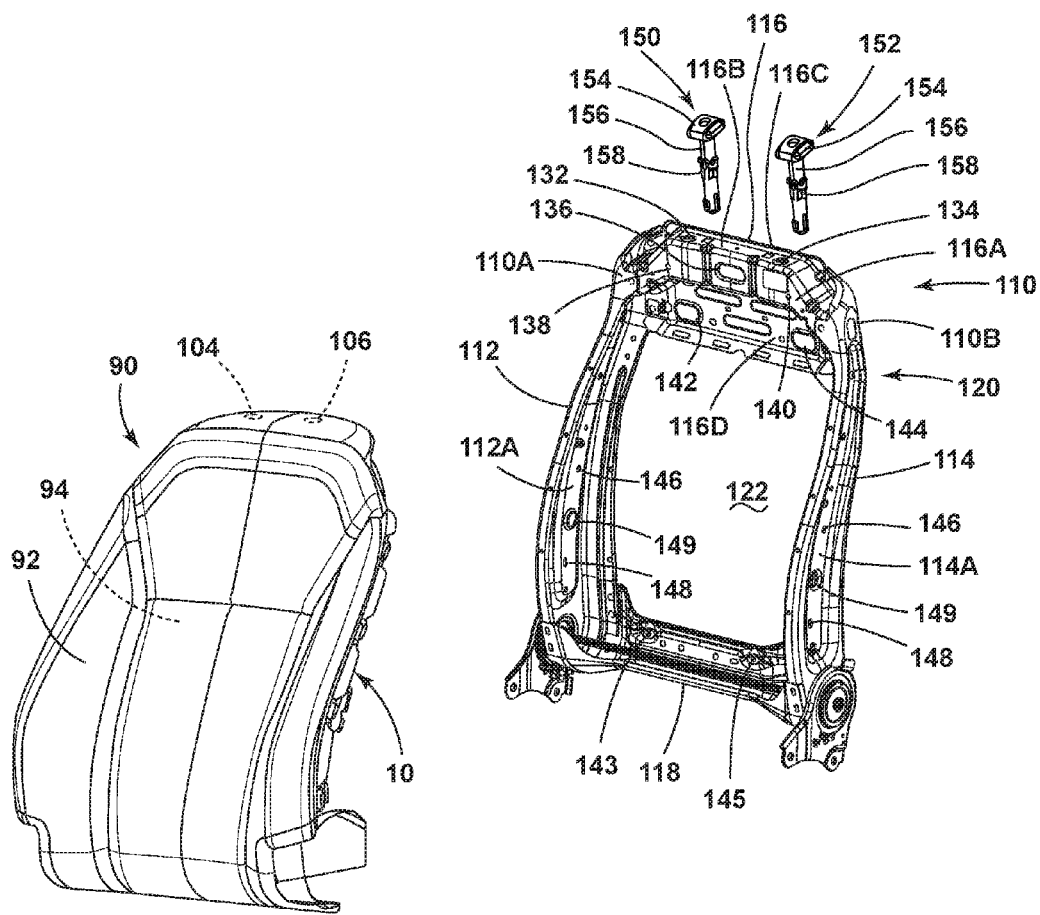
FIG. 5A is a front perspective view of the front seatback module of FIG. 4B showing a seatback frame assembly exploded away therefrom.

Referring now to FIG. 5A, the assembled front seatback module 90 includes the support cushion assembly 94 covered by the trim cover 92. The support cushion 94 and trim cover 92 are coupled to the inner carrier module 10 for support therefrom. In FIG. 5A, the front seatback module 90 is shown exploded away from a seatback frame assembly 110. The seatback frame assembly 110 includes a front side 110A and a rear side 110B. The seatback frame assembly 110 further includes first and second side frame members 112, 114 which are spaced-apart and interconnected by upper and lower frame members 116, 118. The interconnection of the side members 112, 114 and the upper and lower frame members 116, 118 generally defines a frame 120 surrounding a central aperture or window 122. The seatback frame assembly 110 is contemplated to be pivotally coupled to a seat frame assembly for supporting a vehicle occupant in upright and reclined positions. The seatback frame assembly 110 is contemplated to be comprised of a stamped metal material to provide the structural support necessary for carrying the load of a vehicle occupant as well as the vehicle seat components that are coupled to the seatback frame assembly 110 in use. With specific reference to the upper frame member 116, the upper frame member 116 includes a substantially vertical front portion 116A, a substantially horizontal rear portion 116B and a substantially vertical rim portion 116C. First and second receiving apertures 132, 134 are disposed through the substantially horizontal rear portion 116B and are configured to receive guide sleeves 150, 152 therethrough, respectively. The substantially vertical front portion 116A includes a generally centrally disposed locating aperture 136 which is configured to receive the rearwardly extending locator member 56 of the inner carrier module 10 shown in FIG. 4B. By receiving the locator member 56 through the locating aperture 136, the assembled front seatback module 90 is located to the seatback frame assembly 110, thereby aligning other attachment features of the front seatback module 90, the seatback frame assembly 110, and a back panel assembly, as further described below. The substantially vertical front portion 116A of the upper frame member 116 further includes mounting apertures 138, 140 which are configured to align with first and second mounting bosses 38, 40 disposed on the vertical front portion 16A of the inner carrier module 10 as shown in FIG. 1. Disposed below the upper frame member 116, an upper mounting bracket 116D is disposed having first and second receiving slots 142, 144 for receiving hooks from a back panel assembly therethrough, as further described below. As further shown in FIG. 5A, the side frame members 112, 114 generally include inset body portions 112A, 114A having upper and lower mounting apertures 146, 148 which are disposed above and below a receiving aperture 149 on each side frame member 112, 114. In assembly, the receiving apertures 149 are configured to receive a cross member for further rigidifying the structure of the seatback frame assembly 110. The cross member is contemplated to span the distance between the spaced-apart first and second side frame members 112, 114 through the window 122 defined by the frame 120 of the seatback frame assembly 110. The mounting apertures 146, 148 are configured to align with the rearwardly extending upper and lower anchoring plates 80, 82 of the reinforcement brackets 70, 72 using fasteners 84, as best shown in FIG. 5C.

With specific reference to the lower frame member 118, mounting apertures 143, 145 are shown disposed on opposite side of the lower frame member 118 and are used to couple the seatback frame assembly 110 to the inner carrier module 10 at mounting slots 42, 44 disposed on the lower cross member 18 of the inner carrier module 10 (FIG. 3A).

With specific reference to the first and second guides sleeves 150, 152, each guide sleeve 150, 152 includes a head portion 154 with a downwardly extending hollow shaft portion 156 coupled thereto. The downwardly extending shaft portion 156 includes a clip member 158 that is used to clip the guide sleeves 150, 152 to the seatback frame assembly 110 at receiving apertures 132, 134. In assembly, the guide sleeves 150, 152 are received through the access apertures 104, 106 of the support cushion assembly 94 at the upper portion 100 thereof. The guide sleeves are then received through the first and second access apertures 32, 34 of the upper cross member 16 of the inner carrier module 10 as shown in FIG. 1. Finally, the guide sleeves 150, 152 are received through the receiving apertures 132, 134 of the upper frame member 116 of the seatback frame assembly 110, wherein clip members 158 clip to the receiving apertures 132, 134 of the upper frame member 116 of the seatback frame assembly 110. With the guide sleeves 150, 152 in place, the front seatback module 90 is mechanically coupled to the seatback frame assembly 110 without the need for screws, bolts, or other like fasteners. In this way, the front seatback module 90 can be coupled to the seatback frame assembly 110 in a quick and efficient manner before being sent to final assembly.

Figure 5B:
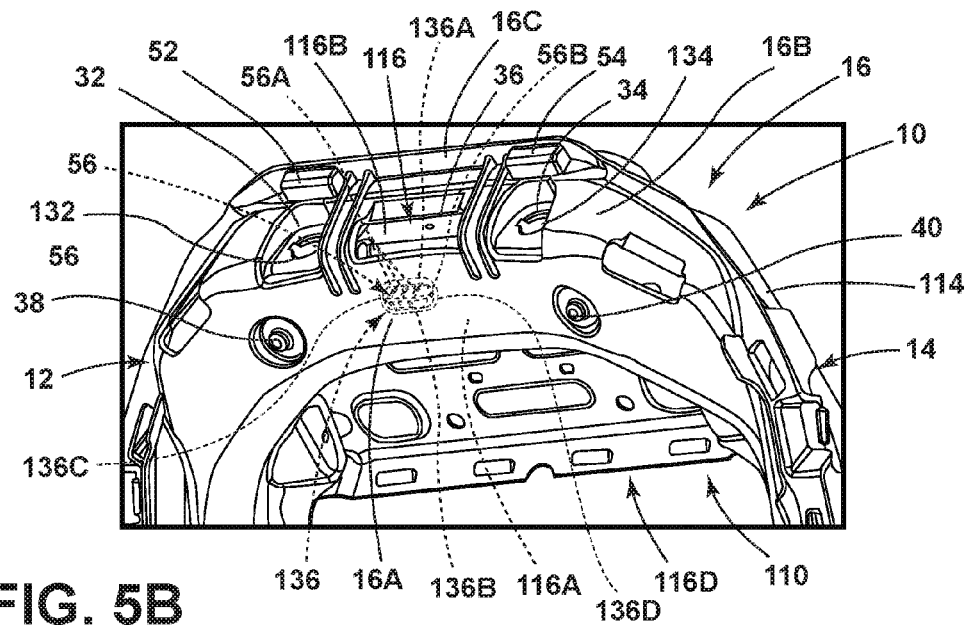
FIG. 5B is a fragmentary front perspective view of an inner carrier module coupled to a seatback frame assembly at upper portions thereof.
Figure 5C:
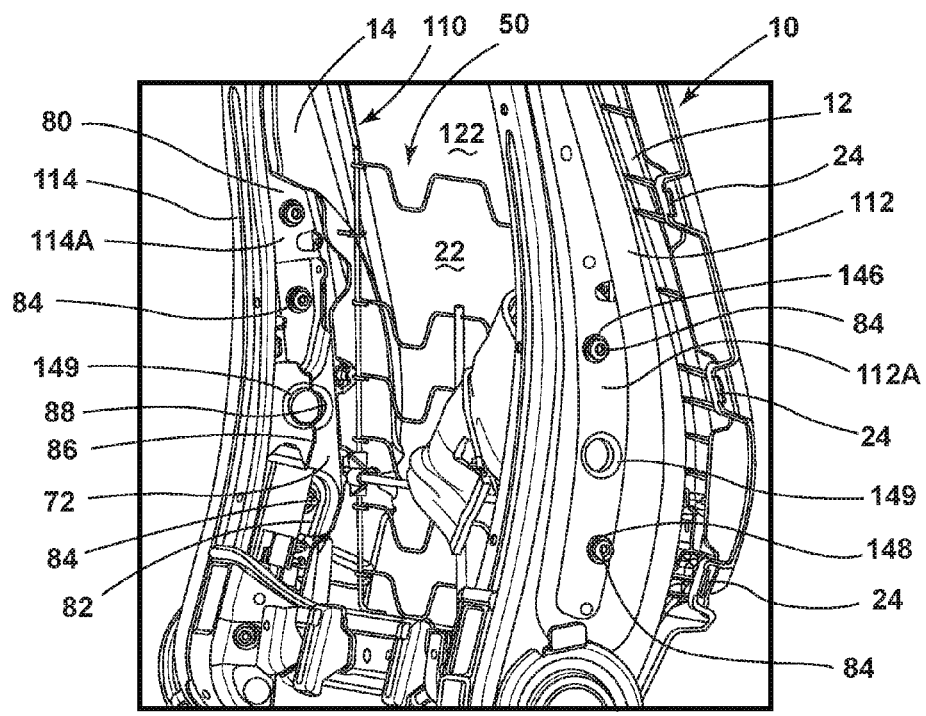
FIG. 5C is a fragmentary rear perspective view of the inner carrier module of FIG. 5B coupled to the seatback frame assembly at middle portions thereof.

Referring now to FIG. 5B, the support cushion assembly 94 has been removed to show the inner carrier module 10 as coupled to the seatback frame assembly 110. With the inner carrier module 10 mounted over the front side 110A of the seatback frame assembly 110, the first and second access apertures 32, 34 of the inner carrier module 10 are shown disposed around the receiving apertures 132, 134 of the seatback frame assembly 110. In this way, the guide sleeves 150, 152 are provided access through the access apertures 32, 34 of the inner carrier module 10 to the receiving apertures 132, 134 of the seatback frame assembly 110. The clip members 158 of the first and second guide sleeves 150, 152 can then clip to the receiving apertures 132, 134 of the seatback frame assembly 110.

With further reference to FIG. 5B, the locator member 56 is shown in phantom as rearwardly extending from the rear side 10B of the inner carrier module 10 at the upper cross member 16. The locator member 56 is received in the locating aperture 136 of the seatback frame assembly 110. The locator member 56 includes a plurality of vertically disposed ribs 56A abutting upper and lower perimeter edges 136A, 136B of the locating aperture 136. In this way, the locator member 56 vertically aligns and locates the inner carrier module 10 to the seatback frame assembly 110 along a z-axis. Further, the locator member 56 includes a plurality of horizontally disposed ribs 56B abutting first and second side perimeter edges 136C, 136D of the locating aperture 136. In this way, the locator member 56 horizontally (or latterly) aligns and locates the inner carrier module 10 to the seatback frame assembly 110 along an x-axis. In this way, the locator member 56 is a 4-way locating member given the 4-way engagement with the four side edges 136A-136D of the locating aperture 136. When the inner carrier module 10 is located to the seatback frame assembly 110 using the interaction of the locator member 56 and locating aperture 136 in an abutting engagement therewith, the access apertures 32, 34 of the inner carrier module 10 are aligned with the receiving apertures 132, 134 of the seatback frame assembly 110. With the access apertures 32, 34 of the inner carrier module 10 aligned with the receiving apertures 132, 134 of the seatback frame assembly 110, the guide sleeves (FIG. 5A) can be received and coupled thereto.

Referring now to FIG. 5C, the inner carrier module 10 is shown coupled to the seatback frame assembly 110 using fasteners 84 which couple the inset body portions 112A, 114A of side frame members 112, 114 to reinforcement brackets 70, 72 using fasteners 84 disposed through the upper and lower anchoring plates 80, 82 which rearwardly extend from the reinforcement bracket 70, 72. As further shown in FIG. 5C, the curved portion 88 of the outer edge 86 of the reinforcement bracket 72 is shown to align with receiving aperture 149 of the side frame member 114. In this way, the reinforcement brackets 70, 72 can be coupled to a cross member disposed between the receiving apertures 149 of the side frame members 112, 114 to reinforce the same.

Figure 6:
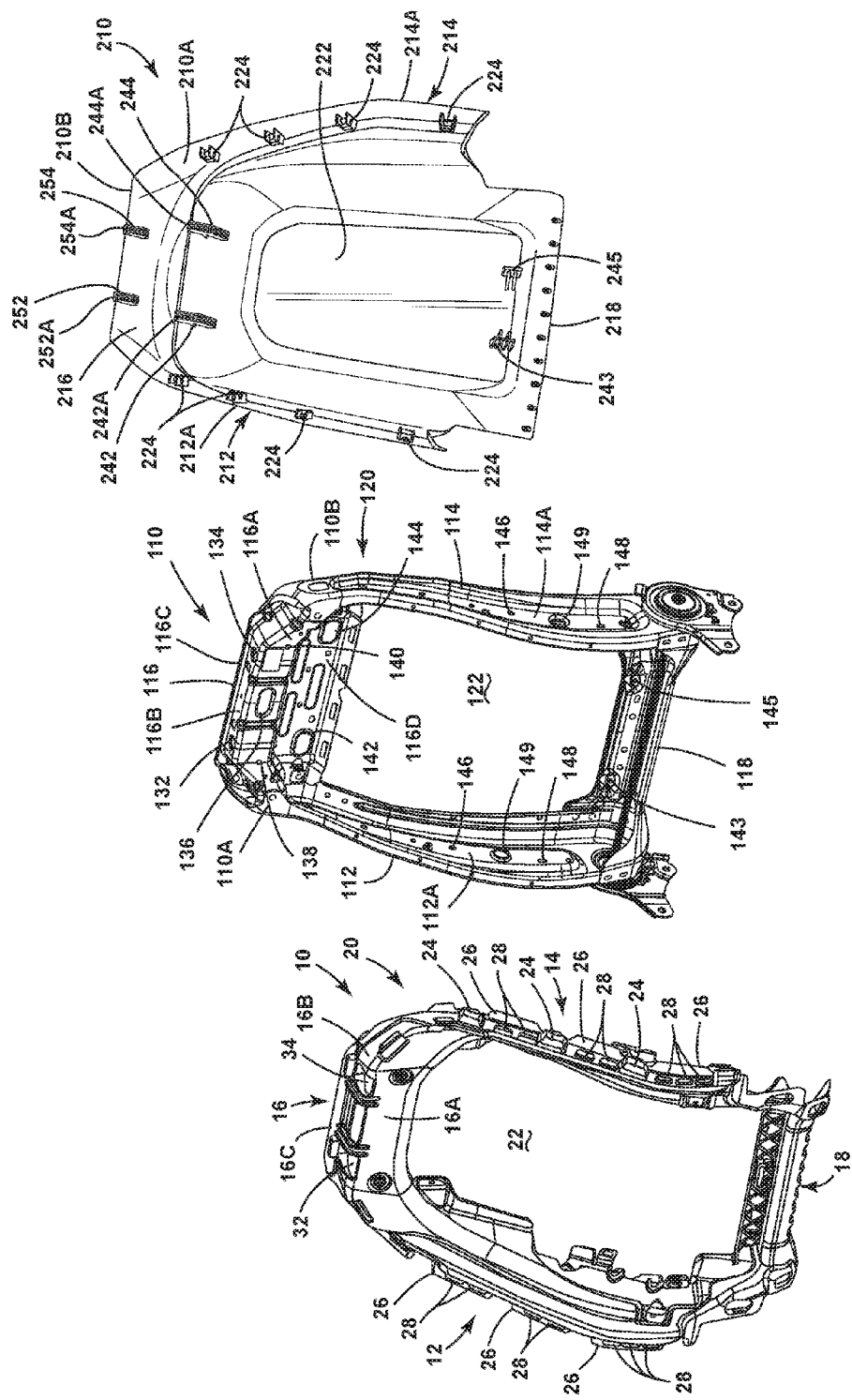
FIG. 6 is an exploded perspective view of a back panel and the front seatback module of FIG. 4B exploded away from a seatback frame assembly.

Referring now to FIG. 6, the seatback frame assembly 110 is shown having the inner carrier module 10 exploded away in a forward direction therefrom. A back panel assembly or module 210 is shown exploded away in a rearward direction from the seatback frame assembly 110. The inner carrier module 10 is shown from the rear side 10B thereof. The rear side 10B of the inner carrier module 10 couples to the front side 110A of the seatback frame assembly 110 in assembly. The back panel module 210 includes a front side 210A and a rear side 210B. The front side 210A of the back panel module 210 is configured to couple to the rear side 110B of the seatback frame assembly 110. The back panel module 210 further couples to the inner carrier module 10 around the seatback frame assembly 110, as further described below.

As shown in FIG. 6, the back panel module 210 includes first and second side members 212, 214 which are generally spaced-apart and interconnected by upper and lower cross members 216, 218. The back panel module 210 further includes a central panel 222 that is generally surrounded by the first and second side members 212, 214 and the upper and lower cross members 216, 218. The back panel module 210 is contemplated to be a composite part which is comprised of a polymeric or injection molded material, such that the back panel module 210, and the features thereof, form a unitary part as shown in FIG. 6. The first and second side members 212, 214 include perimeter edges 212A, 214A having integrally molded clip members 224 disposed therealong. The clip members 224 are configured to clip to the planar mounting surfaces 24A of the clip embossments 24 disposed along the side members 12, 14 of the inner carrier module 10. With the back panel module 210 clipped to the inner carrier module 10, the side members 212, 214 generally cover the side frame members 112, 114 of the seatback frame assembly 110. In this way, the back panel module 210 couples to the inner carrier module 10 around the seatback frame assembly 110. Put another way, the seatback frame assembly 110 is disposed between the inner carrier module 10 and the back panel module 210 when the inner carrier module 10 is coupled to the back panel module 210.

With specific reference to the upper cross member 216 of the back panel module 210, first and second upper hook members 252, 254 are shown having distal ends 252A, 254A. In assembly, the distal ends 252A, 254A of the upper hook members 252, 254 are configured to be received in the mounting channels 52, 54 disposed on the upper cross member 16 of the inner carrier module 10. The upper cross member 216 of the back panel module 210 further includes lower first and second hook members 242, 244 which include distal ends 242A, 244A. In assembly, the lower first and second hook members 242, 244 are configured to be received through receiving slots 142, 144 of the seatback frame assembly 110. In this way, the back panel module 210 couples to both the seatback frame assembly 110 and the inner carrier module 10.

With specific reference to the lower cross member 218 of the back panel module 210, first and second clip members 243, 245 are configured to clip to mounting apertures 143, 145 disposed on the lower frame member 118 of the seatback frame assembly 110.

As noted above, the coupling of the back panel module 210 to the inner carrier module 10 is a releasable coupling, particularly at the coupling of the side members 12, 14 of the inner carrier module 10 and the side members 212, 214 of the back panel module 210. Specifically, the integrally molded clip members 224 of the back panel module 210 releasably couple to the planar mounting surface 24A of the clip embossments 24 which are integrally molded along the side members 12, 14 of the inner carrier module 10. Given the releasable coupling between the inner carrier module 10 and the back panel 210, a side air bag can deploy through the releasable coupling in order to inflate an airbag along a side portion of a vehicle seat. An airbag module can be mounted to the inset body portion 112A or 114A of the seatback frame assembly 110, such that the airbag module would be aligned with a scene disposed between the releasably coupled back panel module 210 and the inner carrier module 10.

In assembling an entire vehicle seatback, the inner carrier module 10 will be coupled to the support cushion assembly 94 to create the front seatback module 90. The front seatback module 90 will then be coupled to the seatback frame assembly 110 by first locating the locator member 56 of the inner carrier module 10 to the locating aperture 136 disposed on the substantially vertical front portion 116A of the upper frame member 116 of the seatback frame assembly 110. By locating the locator member 56 to the locating aperture 136, the access apertures 32, 34 of the inner carrier module 10 should align with the receiving apertures 132, 134 of the seatback frame assembly 110 in a manner as shown in FIG. 5B. With the inner carrier module 10 coupled to the seatback frame assembly 110, fasteners 84 of the reinforcement brackets 70, 72 can be driven into the mounting apertures 146, 148 of the side frame members 112, 114 of the seatback frame assembly 110. With the inner carrier module 10 fixedly coupled to the seatback frame assembly 110, the back panel module 210 can then couple to the inner carrier module 10 and the seatback frame assembly 110.

Figure 7:
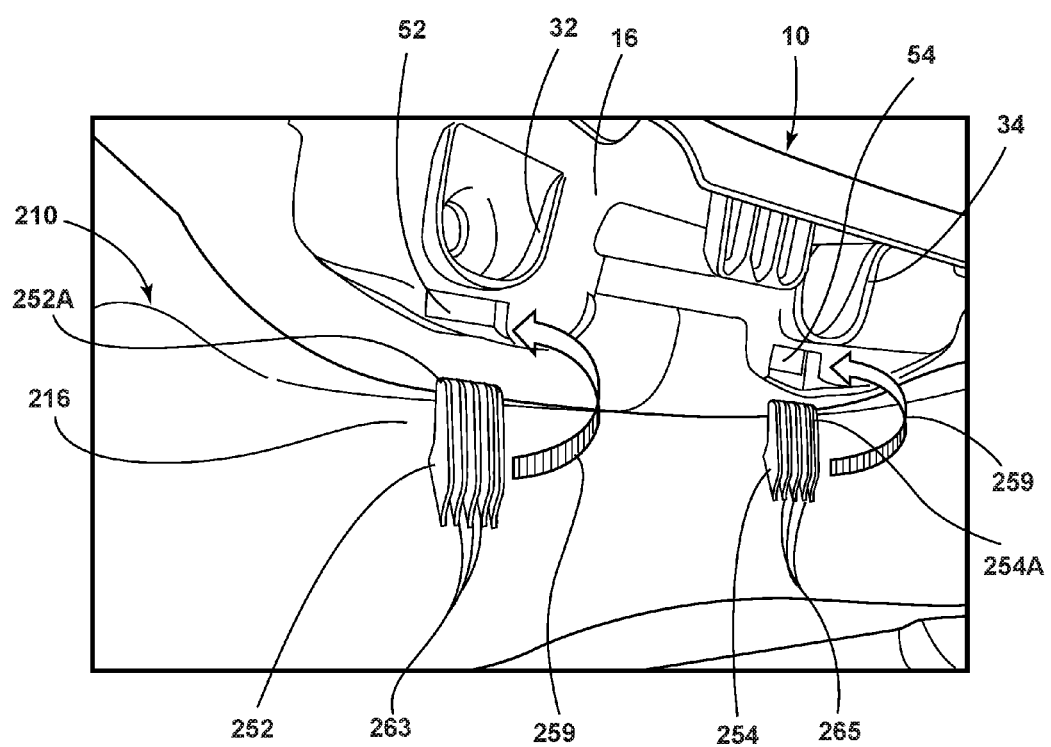
FIG. 7 is perspective view of hooks of the a back panel engaging mounting slots of an inner carrier module.

With specific reference to FIG. 7, the first and second upper hook members 252, 254 disposed on the upper cross member 216 of the back panel module 210 are shown ready to be received in the mounting channels 52, 54 disposed on the upper cross member 16 of the inner carrier module 10. Specifically, the distal ends 252A, 254A of the first and second upper hook members 252, 254 are received in the mounting channels 52, 54 of the inner carrier module 10 along the path as indicated by arrows 259. In the embodiment shown in FIG. 7, the first and second upper hook members 252, 254 are shown as a series of spaced-apart ribs 263, 265 to provide added rigidity to the first and second upper hook members 252, 254.

Figure 8:
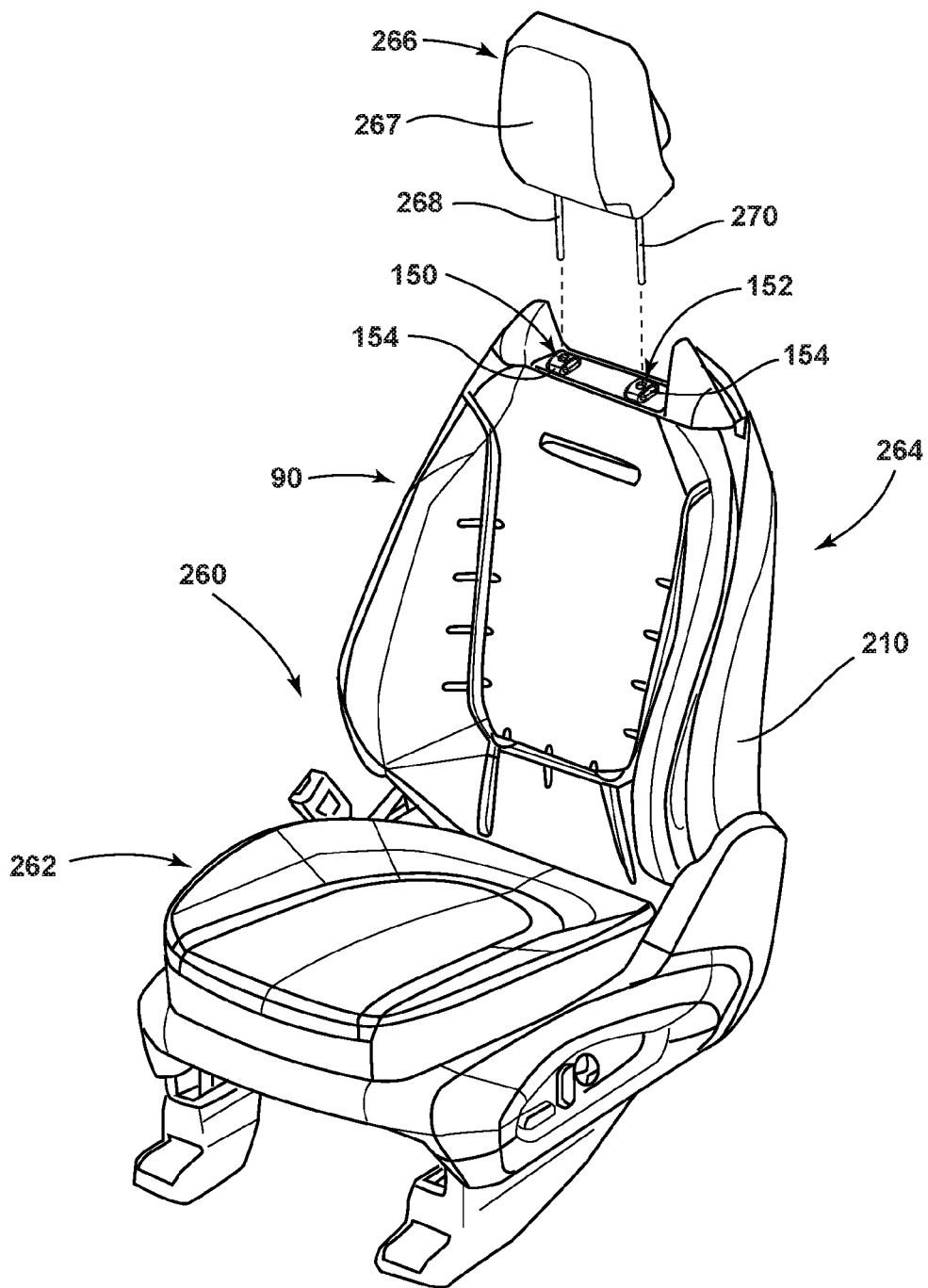
FIG. 8 is a perspective view of an assembled vehicle seat assembly with a headrest assembly exploded away therefrom.

Referring now to FIG. 8, an assembled vehicle seat 260 is shown having a seat portion 262 and an assembled seatback portion 264. The assembled seatback portion 264 is provided by the coupling of the front seatback module 90 the seatback frame assembly 110 and the back panel module 210. A headrest assembly 266 is shown exploded away from an upper portion of the assembled seatback portion 264. With the headrest assembly 266 exploded away from the upper portion of the assembled seatback portion 264, the head portions 154 of the first and second guide sleeves 150, 152 are shown. The headrest assembly 266 includes first and second support posts 268, 270 which are received within the hollow shaft portions 156 (FIG. 5A) of the first and second guide sleeves 150, 152 and vertically adjustable within. The headrest assembly 266 further includes a headrest bun 267 that is supported by the first and second support posts 268, 270.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seatback assembly, comprising:
an inner carrier module having first and second side members and an upper cross member, the upper cross member having first and second mounting channels and first and second access apertures disposed therethrough;
a seatback frame assembly having first and second side frame members and an upper frame member with first and second receiving apertures disposed therethrough, wherein the inner carrier module mounts to a front side of the seatback frame assembly, such that first and second access apertures of the inner carrier module are aligned with the first and second receiving apertures of the seatback frame assembly; and
a back panel module having first and second side members and an upper cross member with first and second upper hook members disposed thereon, wherein the back panel module mounts to a rear side of the seatback frame assembly, and further wherein the first and second upper hook members are partially received in the first and second mounting channels of the inner carrier module.

2. The seatback assembly of claim 1, including:
first and second guide sleeves received through the first and second access apertures of the inner carrier module.

3. The seatback assembly of claim 2, wherein the first and second guide sleeves are operably coupled to the first and second receiving apertures of the seatback frame assembly.

4. The seatback assembly of claim 3, including:
a headrest assembly having support posts received in the guide sleeves.

5. The seatback assembly of claim 1, including:
a locator member disposed on a rear side of the inner carrier module, wherein the locator member extends outwardly from the upper cross member of the inner carrier module.

6. The seatback assembly of claim 5, including:
a locating aperture disposed through the upper frame member of the seatback frame assembly, wherein the locator member of the inner carrier module is received in the locating aperture of the seatback frame assembly.

7. The seatback assembly of claim 6, wherein the locator member includes a plurality of vertically disposed ribs abutting upper and lower perimeter edges of the locating aperture.

8. The seatback assembly of claim 7, wherein the locator member includes a plurality of horizontally disposed ribs abutting first and second side perimeter edges of the locating aperture.

9. The seatback assembly of claim 1, including:
first and second lower hook members disposed below the upper hook members one the back panel module; and
an upper mounting bracket disposed on the seatback frame assembly below the upper cross member, the upper mounting bracket including first and second receiving slots, wherein the first and second lower hook members of the back panel module are received through the first and second receiving slots of the seatback frame assembly.

10. The seatback assembly of claim 1, including:
a support cushion assembly coupled to and supported by the inner carrier module along a front side of the inner carrier module.

11. The seatback assembly of claim 1, wherein the first and second side members of the inner carrier module are releasably coupled to the first and second side members of the back panel module.

12. A seatback assembly, comprising:
an inner carrier module having first and second access apertures and an outwardly extending locator member;
a seatback frame assembly having first and second receiving apertures, a locating aperture, and first and second receiving slots, wherein the locator member of the inner carrier module is received in the locating aperture of the seatback frame assembly from a front side of the seatback frame assembly to align the access apertures of the inner carrier module with the receiving apertures of the seatback frame assembly; and
a back panel module having first and second upper hook members received in the receiving slots of the seatback frame assembly to mount the back panel to a rear side of the seatback frame assembly.

13. The seatback assembly of claim 12, wherein the inner carrier module includes first and second side members, and further wherein the seatback frame assembly includes first and second side frame members.

14. The seatback assembly of claim 13, including:
first and second reinforcement brackets coupled to the first and second side members of the inner carrier module.

15. The seatback assembly of claim 14, wherein the first and second reinforcement brackets each include outwardly extending upper and lower anchoring plates coupled to the first and second side frame members, respectively, of the seatback frame assembly.

16. The seatback assembly of claim 12, wherein the locator member includes a plurality of ribs abutting upper and lower perimeter edges of the locating aperture and first and second side perimeter edges of the locating aperture.

17. The seatback assembly of claim 12, including:
first and second guide sleeves received through the first and second access apertures of the inner carrier module, wherein the first and second guide sleeves are operably coupled to the first and second receiving apertures of the seatback frame assembly.

18. A seatback assembly, comprising:
an inner carrier module having an upper cross member with a substantially vertical front portion and a substantially horizontal rear portion, wherein first and second access apertures are disposed through the substantially horizontal rear portion, and further wherein a locator member outwardly extends from a rear side of the substantially vertical front portion; and
a seatback frame assembly having an upper frame member with first and second receiving apertures and a locating aperture, wherein the locator member of the inner carrier module is received in the locating aperture of the seatback frame assembly to align the first and second access apertures of the inner carrier module with the first and second receiving apertures of the seatback frame assembly.

19. The seatback assembly of claim 18, including:
first and second guide sleeves received through the first and second access apertures of the inner carrier module, wherein the first and second guide sleeves are operably coupled to the first and second receiving apertures of the seatback frame assembly.

20. The seatback assembly of claim 18, wherein the locator member includes a plurality of vertical ribs abutting upper and lower perimeter edges of the locating aperture, and a plurality of horizontal ribs abutting and first and second side perimeter edges of the locating aperture.

* * * * *